(12) United States Patent
Wein

(10) Patent No.: US 9,111,184 B2
(45) Date of Patent: *Aug. 18, 2015

(54) ENTRANCE TICKET WITH LIGHTING EFFECT

(76) Inventor: Michael Wein, Austin, TX (US)

( * ) Notice: Subject to any disclaimer, the term of this patent is extended or adjusted under 35 U.S.C. 154(b) by 426 days.

This patent is subject to a terminal disclaimer.

(21) Appl. No.: 13/366,243

(22) Filed: Feb. 3, 2012

(65) Prior Publication Data

US 2012/0162971 A1    Jun. 28, 2012

Related U.S. Application Data

(63) Continuation-in-part of application No. PCT/US2010/043839, filed on Jul. 30, 2010, which is a continuation of application No. 12/534,813, filed on Aug. 3, 2009, now Pat. No. 8,006,899.

(51) Int. Cl.
| | |
|---|---|
| *F21L 4/00* | (2006.01) |
| *G06K 19/04* | (2006.01) |
| *A63H 37/00* | (2006.01) |
| *H05B 37/02* | (2006.01) |

(52) U.S. Cl.
CPC ............ *G06K 19/04* (2013.01); *A63H 37/00* (2013.01); *H05B 37/029* (2013.01); *H05B 37/0272* (2013.01)

(58) Field of Classification Search
USPC ............ 362/183, 184, 190, 249.01; 235/382, 235/494
See application file for complete search history.

(56) References Cited

U.S. PATENT DOCUMENTS

| | | | |
|---|---|---|---|
| 6,404,409 B1 | 6/2002 | Solomon | |
| 6,965,205 B2* | 11/2005 | Piepgras et al. | 315/318 |
| 7,011,435 B1* | 3/2006 | Blaymore | 362/382 |
| 7,614,771 B2* | 11/2009 | McKechnie et al. | 362/543 |
| 8,006,899 B2 | 8/2011 | Wein | |
| 2001/0018660 A1 | 8/2001 | Sehr | |
| 2005/0188167 A1 | 8/2005 | Squibbs et al. | |
| 2006/0176689 A1* | 8/2006 | Dowdy et al. | 362/188 |
| 2006/0244435 A1 | 11/2006 | Watanabe et al. | |
| 2007/0195544 A1* | 8/2007 | Graves, Jr. | 362/510 |
| 2011/0058363 A1* | 3/2011 | Fattizzi | 362/190 |

* cited by examiner

*Primary Examiner* — Meghan Ulanday
(74) *Attorney, Agent, or Firm* — Buskop Law Group, PC; Wendy Buskop

(57) ABSTRACT

A apparatus having an embedded processor in a substrate for creating a synchronous lighting effect at a controlled access venue and a method for creating a lighting effect at a controlled access venue while controlling access to the venue simultaneously using a apparatus that coordinates with the performance allowing a holder of the apparatus to perform with the performance.

10 Claims, 5 Drawing Sheets

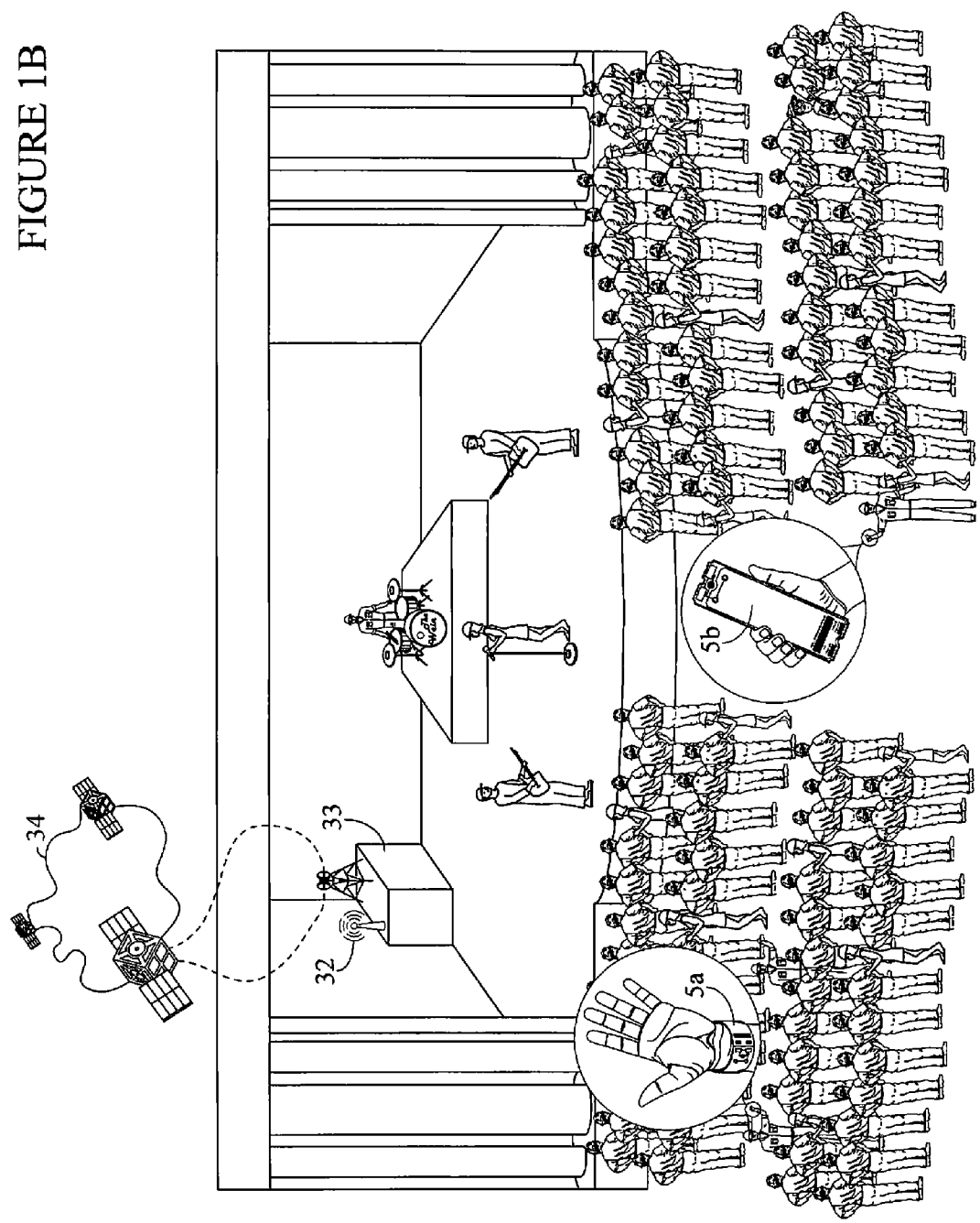

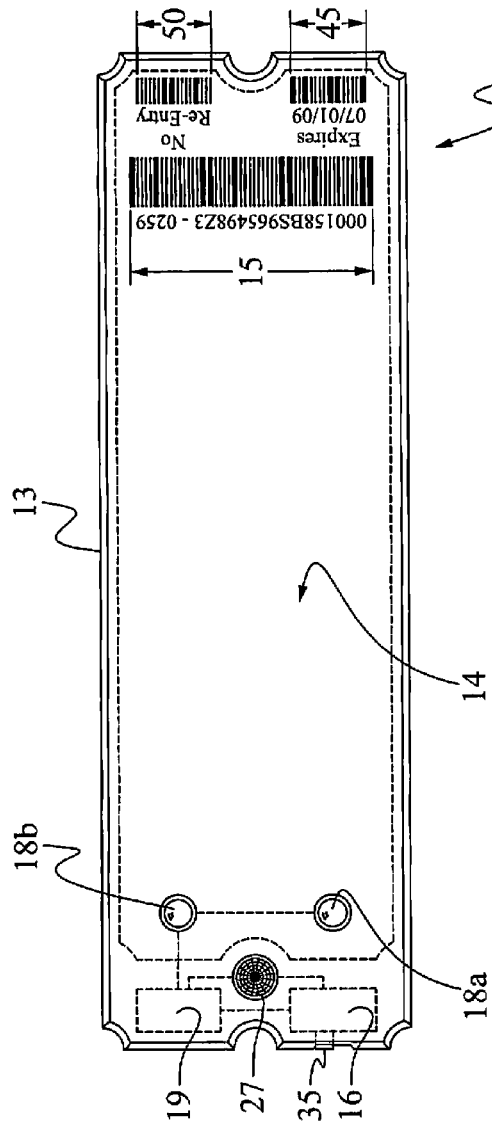
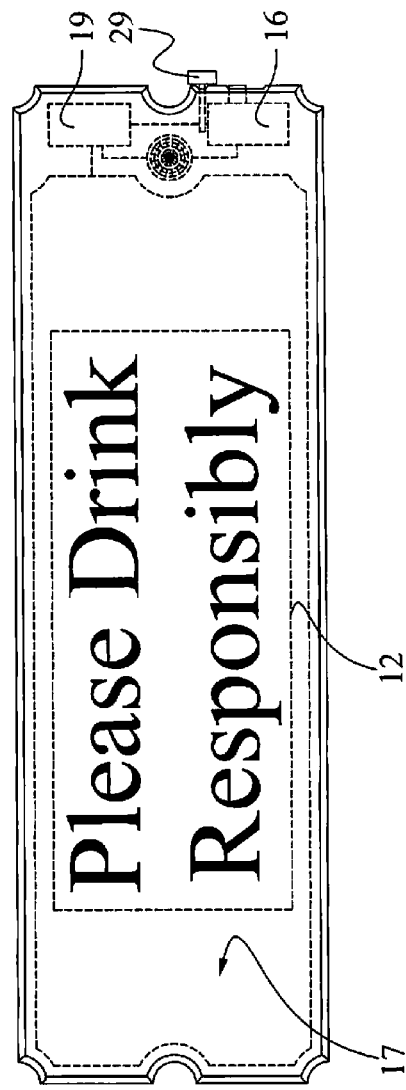
FIGURE 2
FIGURE 3

ENTRANCE TICKET WITH LIGHTING EFFECT

The present application claims priority to and the benefit of co-pending International Application No. PCT/US2010/043839, filed on Jul. 30, 2010, entitled "ENTRANCE TICKET WITH LIGHTING EFFECT," which claims priority to U.S. patent application Ser. No. 12/534,813 filed on Aug. 3, 2009 entitled, "ENTRANCE TICKET WITH LIGHTING EFFECT," which is now issued as U.S. Pat. No. 8,006,899. These references are hereby incorporated in their entirety.

FIELD

The present embodiments generally relate to a apparatus and a method of use of a apparatus that operates to provide admission to a controlled access venue and to create a lighting effect synchronized with other audience members, enabling the holder to gain admission to the venue and to participate with a performance at the venue.

BACKGROUND

A need exists for an apparatus that can provide for tracking of admissions, controlling access of admissions, as well as enabling an attendee to interact with a performance at a controlled access venue, thereby enabling the attendee to more fully become involved in the event.

A need exists for a method of using a dual purpose apparatus that can provide for tracking of admissions, controlling access of admissions, as well as enabling an apparatus holder to interact with a performance at a controlled access venue, thereby enabling the apparatus holder to more fully become involved in a performance.

The present embodiments meet these needs.

BRIEF DESCRIPTION OF THE DRAWINGS

The detailed description will be better understood in conjunction with the accompanying drawings as follows:

FIG. 1B shows an alternative embodiment of a diagram of a controlled access venue with the apparatus for the lighting effect contained in it.

FIG. 2 is a front view of the apparatus.

FIG. 3 shows a back view of the apparatus.

Figure 1A:
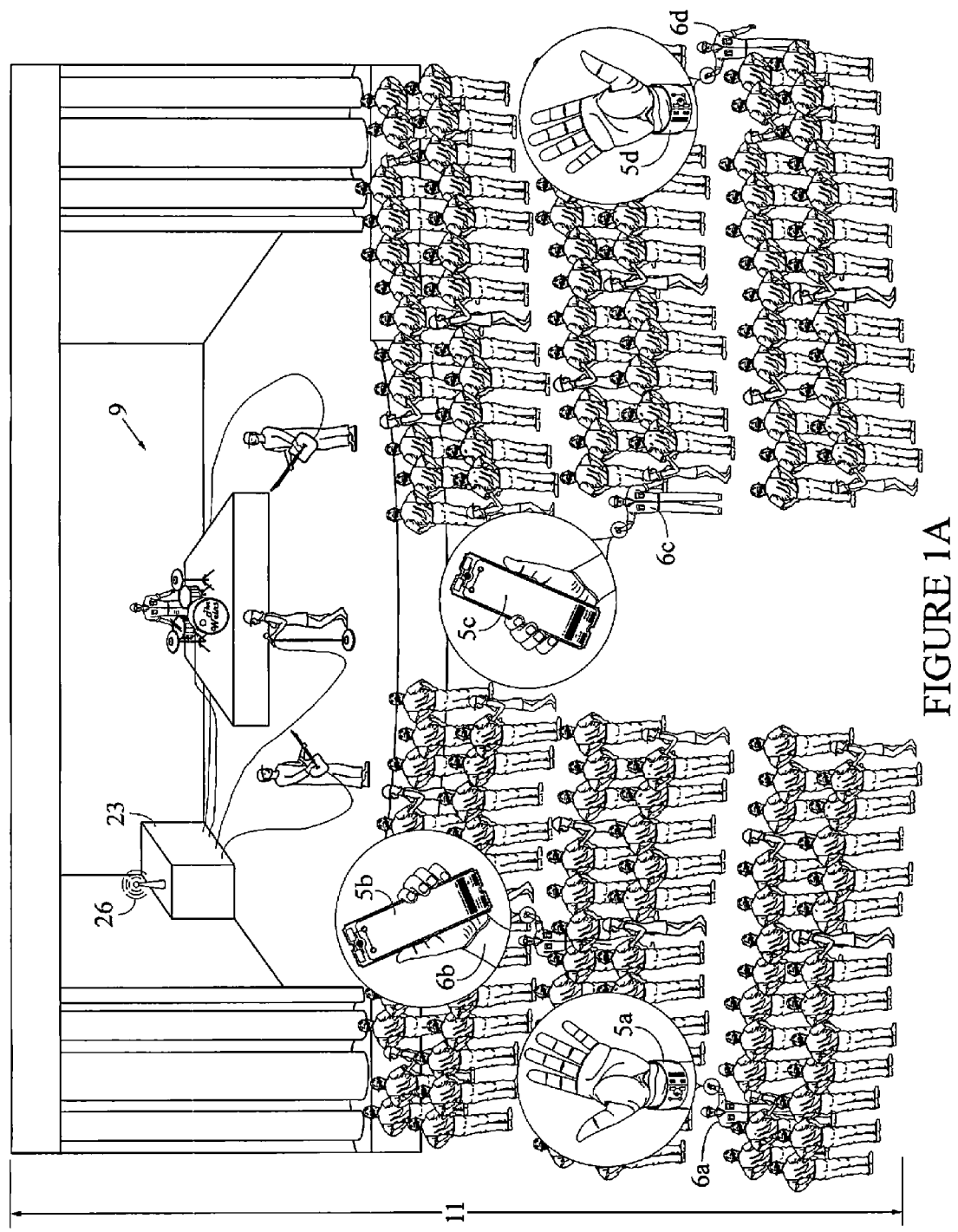
FIG. 1A shows a diagram of a controlled access venue with the apparatus for the lighting effect contained in it.

The present embodiments are detailed below with reference to the listed Figures.

DETAILED DESCRIPTION OF THE EMBODIMENTS

Before explaining the present apparatus and method in detail, it is to be understood that the apparatus and method are not limited to the particular embodiments and that the invention can be practiced or carried out in various ways.

The present embodiments relate to an apparatus and method for creating a lighting effect in a controlled access venue.

The method can include providing an apparatus for creating a lighting effect in a controlled access venue. The apparatus can include a substrate. The substrate can be any material. The apparatus can have a power source connected with a power source embedded in the substrate.

The at least one light emitting device is configured to provide a lighting effect. The lighting effect can a steady glow at a fixed intensity, a variably intensity, a flicker on and off, a change of colors, a smooth flow, or other predetermined lighting effect.

Accordingly, the method can include causing manipulation of the light emitting device to create the lighting effect. The manipulation of the light emitting device can be caused by any telemetry interacting with a processor configured to control the light emitting device. The manipulation of the telemetry can cause the lighting effect. For example, a signal can be sent to a processor in communication with the light emitting device to cause the light emitting device to alternate between a first color and a second color. In illustration, the signal can interact with the processor causing manipulation of the light emitting device to produce an image. The manipulation of the light emitting device can cause any desired lighting effect.

In one or more embodiments, the telemetry causing the manipulation of the lighting effect can be configuring a processor in communication with the light emitting device to manipulate the light emitting device to provide a predetermined lighting effect in accordance with a specific instrument being played. For example, the processor can manipulate the light emitting device to provide a lighting effect of a flashing light that flashes in correlation to beats of a drum.

In one or more embodiments, the method can include providing a first set of apparatus to a first set of attendees, and providing a second set of apparatus to a second set of attendees. The method can also include manipulating the lighting effect of the first set of apparatus according to sound emitted from a first instrument, and manipulating the lighting effect of the second set of apparatus according to sound emitted from a second instrument.

The apparatus can be an item passed out at the venue, a ticket to the venue, or the like.

In one or more embodiments, the light emitting device can be a sticker passed out at the venue that can be attached to a substrate that was provided with the ticket and configured to connect with the power source in the substrate.

In one or more embodiments, the power supply can be a sticker passed out at the venue and configured to connect with a light emitting device on the substrate. The substrate can be the ticket or the like.

The apparatus can create a synchronously presented lighting effect from an audience in a controlled access venue, such as a music theater or a concert hall, during a performance.

Each of the plurality of apparatus can have a substrate with a first side for supporting a readable identification code and a second side for supporting a message such as "don't smoke" or "danger high decibels expected." The substrate can have a thickness less than about 0.4 inches, can weigh less than about 2 ounces, and can be flexible.

The identification code can be a bar code, a numerical code, an alphanumeric code, a radio frequency identification "RFID" tag, or a series of "check digits" used to verify a code, which are known in the warehouse packing industry.

A power source can be disposed or embedded within the substrate, such as a small camera battery or other battery. The power source can be from about 1 volt to about 9 volts and can originate from a battery such as a hearing aid battery, a printable battery, a watch battery, a lithium ion battery, a rechargeable battery, a solar battery, or any other commercially available battery.

Any number of light emitting devices can be electrically connected to the power source for use during the performance. The at least one light emitting device can be anything capable of emitting light. For example, the at least one light emitting device can be a light emitting diode "LED", an organic light-emitting diode "OLED", a luminescent, or the like. The light emitting device can have a plurality of pixels, lines, or any intensity.

A controller with a processor, and a data storage can be disposed in the substrate. The processor can be in communication with the data storage and can further be in electrical communication with the power source and the at least one light emitting device.

Computer instructions can be stored in the data storage, which can be used to instruct the processor to operate the lights in a predetermined sequence. The processor can be activated by a musical beat, by a melody, by a pitch line, or the processor can activate as a reaction to the performance on the stage of the controlled access venue. The data storage can be flash memory. The processor can be microprocessor.

The apparatus can have an actuator associated with the substrate which can be, in an embodiment, embedded in the substrate for initiating flashing of the lights based on a predetermined set of computer instructions which determine how the lights flash, including the sequence of the flashing.

The actuator can be in direct communication with the processor. The actuator can be a sound receiver which can receive a sound from the stage or a signal from a performance transmitter and can then initiate the lighting effect. The signal from the performance transmitter can be referred to herein as a first signal.

The sound receiver can be a microphone or any other commercially available sound receiver.

The apparatus can have an actuator that is a pull tab, which can be disposed at least partially in the substrate acting as a separator between the power source and the processor, so that when the pull tab is removed a connection between the processor and the power source is formed such that the processor can receive power and can utilize the computer instructions on the data storage which determines the sequence of the lighting effect.

In operation, the pull tab can be torn off of the substrate, thereby establishing a circuit between the power source and the processor and sending a signal to initiate the processor. The pull tab can initially be disposed between the power source and the processor, thereby disrupting any electronic signal from communicating between the power source and the processor. Upon removal of the pull tab from the substrate, the pull tab will no longer be disrupting any electronic signal between the power source and processor, allowing the processor to be initiated.

In an embodiment, the pull tab can be disposed on a tear tab, such as a perforated ticket stub. The tear tab can be removed from the apparatus or substrate by tearing the tear tab from the apparatus or substrate along the perforation. As the tear tab is removed from the substrate, the pull tab is simultaneously removed from the substrate, thereby establishing electrical communication between the power source and the processor. In this manner, the tear tab cannot be reattached to the substrate, thereby ensuring that the apparatus is only usable for one performance.

In an embodiment, the actuator can initiate the processor when it receives a second signal from a network transmitter connected to a network to start the lighting sequence or to change a lighting sequence that has been started.

Alternatively, a switch, such as an electronic on/off switch, can be embedded in the substrate or attached to the surface of the substrate. The switch can mechanically initiate the light individually or can initiate the flashing light sequence.

Combinations of actuators can be usable in an embodiment of the apparatus.

The processor of each apparatus can operate synchronously to create a lighting effect such as three short flashing lights, followed by two long flashing lights, followed by three short light flashes to interact and send a message with music being performed on stage. Another part of the same audience can have different computer instructions, which flash those lights in a counterpoint beat to the first group of audience members. Similarly, there can be a third group of audience members, which can be all with green lights, that flash as a group in between the other flashing lights which can be red or blue. Additional colors or multicolored lights can be useable with the embodiments.

Simultaneously the processors for the plurality of apparatus can synchronously operate during the performance all the while serving the dual purpose of controlling access to the controlled access venue. These unique apparatus can allow each holder to interactively participate with the performance as a member of the performance with the apparatus.

The apparatus can be contemplated in an embodiment to have a flexible substrate, which can be reusable. In an embodiment, the flexible substrate can have a thickness of less than about 1 inch, and a weight of less than about 5 ounces.

The first signal can be an audio signal or a wireless signal. In an embodiment, the audio signal can have a preset frequency limit that represents a bass frequency range, a treble frequency range, a sequence of pitches, or a drum beat sequence to initiate the actuator on each of the plurality of apparatus.

An embodiment can contemplate that the audio signal and the wireless signal can come from the network, which can be initiated at a predetermined time.

In an embodiment, the auto signal and the wireless signal can be generated by a user, such as by a disc jockey "DJ", an operator, a sound technician, or similar user, by tapping a beat using a mouse, an Ipod™, an Iphone™, or another similar device, which can be in communication with the network, such as with a computer, laptop, personal digital assistant, a cellular phone, or combinations thereof.

The apparatus can additionally have an expiration date programmed into the computer instructions in the data storage for deactivating the processor, so that a apparatus used for the Beach Boys in New Jersey, on Jun. 22, 2009 can not be used again to see the Beach Boys in Chicago on Jun. 23, 2009.

It can be contemplated that the light can be a light emitting diode (LED), a fluorescent light, a halogen light, a neon light, or combinations thereof.

Another embodiment can contemplate that an electroluminescence coating can be printed on the substrate and can also act as the lighting effect, replacing the light for some uses, and acting in conjunction to the light in other uses. In addition, electroluminescent wire can be used, which can also act as the lighting effect.

If lights are used, the lights can be connected together on the apparatus in series, in parallel, or combinations thereof, to the power source.

An embodiment contemplates that the substrate can also include a lighter and the actuator can be a removable pin removable from the lighter to allow the sequence of lights to electrically engage the power source and initiate.

The lighter can have a case, which can be 100 percent engulfed with electroluminescence, electroluminescent wires, or chemi-luminescence paint or a similar coating that appears to glow independently without the need for any additional stimulating light. An embodiment can be contemplated for use with black lights.

In an embodiment, the apparatus can be imprinted and a "smart" lighter with a removable pin for engaging the lighter, such as a magnet pin that can be detachable at the venue with a security controllable pin removing device.

In this embodiment, the lighter can also include a microprocessor and data storage, which can also have computer instructions for producing a lighting effect as described previously.

Another embodiment can contemplate that the removable pin can only be removable by a security guard, that the removable pin can in fact be a security controllable pin that can require a security controllable pin removing device that is only used at an entrance to the controlled access venue.

The substrate of the apparatus can be contemplated to be one or more of the following types of items: a stiff paper, a non-forming flexible but crystalline plastic, a cardboard sheet, a thin aluminum plate, a flexible metal plate, a rubberized plate or a 2 millimeter thin plate of another flexible but shape supporting synthetic material.

The power source can be a AAA DC battery, a AA battery, a lithium ion battery, a solar cell, a watch battery, a hearing aid battery, or any other commercially available battery. It can be contemplated that the power source can be rechargeable for an embodiment. It can be contemplated that the power source can be replaceable for another embodiment.

It can be contemplated that the power source can be a printable battery, such as one from the Fraunhofer Research Institution for Electronic Nano Systems ENAS, of Germany. This embodiment is environmentally friendly, as the printable battery contains to no mercury.

The apparatus can include a substrate that can operate as a wrist band, a neck band, head gear, a neck lanyard, a brooch, a T-shirt, sunglasses, or another wearable apparatus with a lighting effect.

An embodiment contemplates that the apparatus can have a "no reentry" code, which can prohibit reentry of apparatus to the controlled access venue.

In order to more fully understand the apparatus, an embodiment of a method of using the apparatus can include the steps of:

(a) gaining access to a controlled access venue using a apparatus with a substrate, with an actuator embedded within the substrate, wherein the actuator is connected to a power source embedded in the substrate, at least one light embedded in the substrate, a controller with a processor embedded in the substrate, data storage communicating with the processor embedded in the substrate, computer instructions in the data storage for instructing the processor to operate at least one light;

(b) actuating at least one light on the apparatus comprising a step selected from the group consisting of: pulling on a pull tab; receiving a first signal from a performance transmitter; tearing off a tear tab disposed on the substrate, wherein a pull tab is disposed on the tear tab; engaging a switch embedded in the substrate; receiving a second signal from a network transmitter connected to a network; actuating a switch disposed on the substrate; and receiving a first signal from a performance venue; and (c) receiving a second signal from a network to synchronously operate each of the least one lights to create a synchronous lighting effect with each processor of each apparatus in an audience, while controlling access to the controlled access venue, allowing each member of the audience to interactively participate with a performance.

Turning now to the Figures, FIG. 1A shows a controlled access venue 11 with a plurality of apparatus, 5a, 5b, 5c, 5d. Each apparatus can be held by a member of the audience 6a, 6b, 6c, 6d. The performance 9 can occur on a stage in front of the audience or can be viewable by the audience. The performance can be remote, or can be electronically connected to the audience in the manner of live aid concerts, which can have remote audiences to the show going on in London.

Also shown in FIG. 1A is a performance transmitter 23 for transmitting a first signal 26.

FIG. 1B shows an alternative embodiment of FIG. 1A, with a network 34 in communication with a network transmitter 33 for transmitting a second signal 32 to the plurality of apparatus 5a, 5b, 5c, 5d.

FIG. 2 shows a front view of an apparatus 5a. The apparatus can have a substrate 13, which can be flexible and can be made of a plastic. The plastic can be clear and transparent. The plastic can also be a crystalline polypropylene or homopolymer of polyethylene that can withstand temperatures up to about 112 Fahrenheit without deforming or melting.

The substrate 13 can have a first side 14, which can have a non-removable readable identification code 15. The identification code can be intended to not only be readable by a scanner, such as a bar code, but can be readable or scanned by a human.

In the substrate 13 can have a power source 16 that can be battery. Also in the first side 14 can be a first light 18a and a second light 18b, which can be the same color, different colors, or multicolored. The lights can be connected to the power source 16.

A controller 19 can also be connected to at least one light 18a, 18b, which can be connected in series, in parallel, or combinations thereof. The controller 19 can be in communication with the power source 16.

FIG. 2 also shows the sound receiver 27 which is depicted connected to the power supply 16 and the controller 19. The sound receiver 27 can be a wireless signal receiver, or an infra red detector, which the first signal can be transmitted to via the network.

The apparatus is shown with a switch 35 for actuating the lighting effect using the lights. The apparatus can also have an expiration date 45 and a no reentry code 50.

It can be contemplated that additional embodiment can have the following features:

FIG. 3 shows the opposite side of the apparatus 5a of FIG. 2 with the second side 17 supporting a message 12. This Figure also shows the pull tab 29, which is disposed as a block between the controller 19 and the power source 16. In this embodiment, once the pull tab is pulled or torn, it will remove the block from the power source to the controller and initiate the lighting effect.

Figure 4:
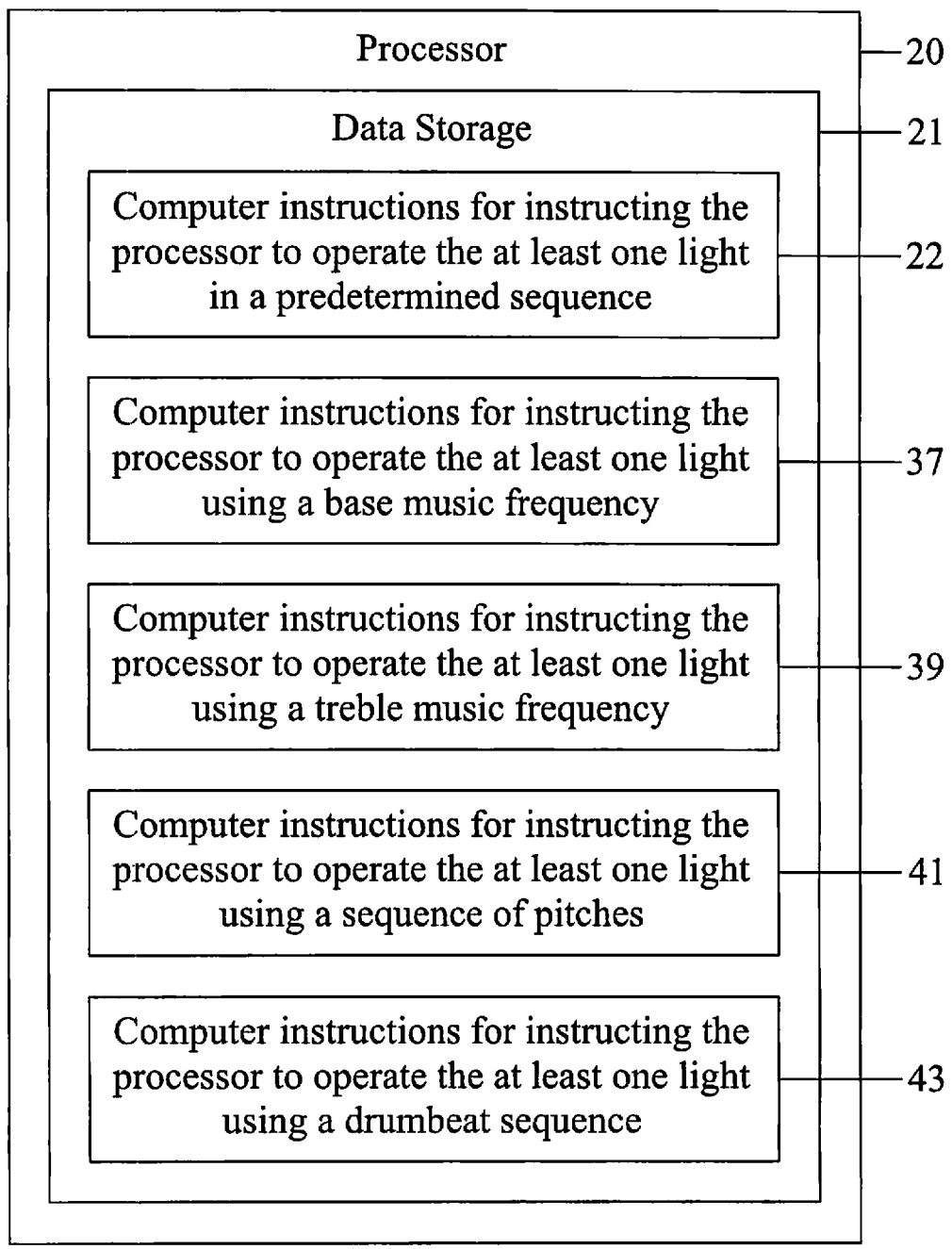
FIG. 4 is a diagram of the processor with computer instructions in data storage.

FIG. 4 shows a processor 20 with data storage 2, which can further have computer instructions 22, which can include computer instructions to instruct the processor to operate the at least one light using a predetermined sequence 22, a bass music frequency 37, a treble music frequency 39, a sequence of pitches 41 or a drumbeat sequence 43.

The lighting effect can be pulsed based on the beat or tempo of the music. The lights can be individually preprogrammed lights with flashing sequences. The lights can be operated based on a seat location and can be based on the audio sequence of the performance.

In an embodiment, certain lights on certain apparatus can operate based on the performer, such as group A can operate during the drumbeat sequence, provided by a drummer of the performance, and group B can operate during the bass music frequency, provided by a bassist of the performance.

The lights can change in intensity, color, pulsation, on/off signaling based on the mood of the music, the tempo of the music and the dynamic of the music.

The colors of the lights can further be operated based on sponsorships of the venue.

Figure 5:
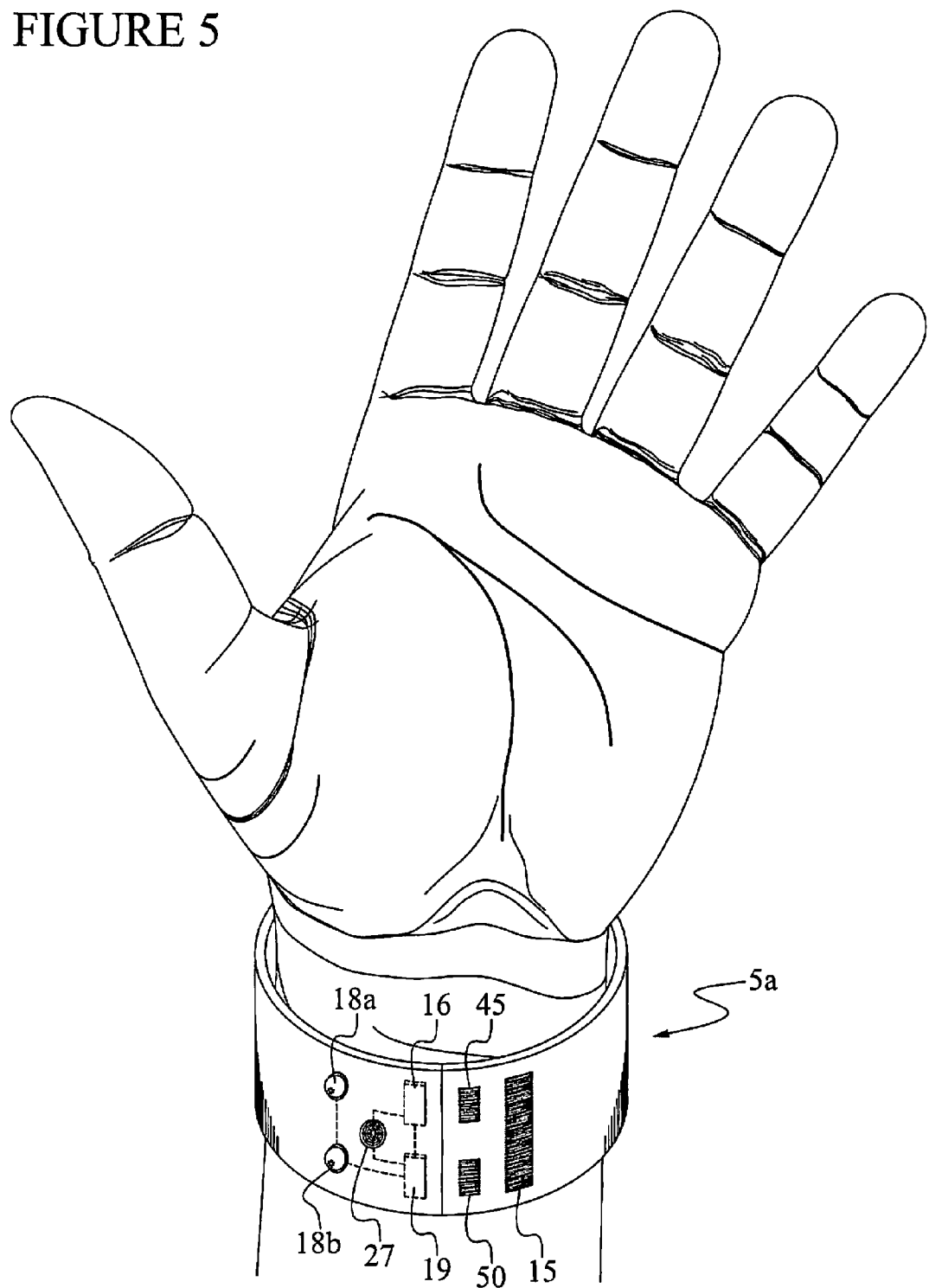
FIG. 5 shows a wristband embodiment of the apparatus.

FIG. 5 shows an embodiment of the apparatus 5a, wherein the apparatus 5a is a wristband. The wristband embodiment of the apparatus 5a is further shown with first light 18a and second light 18b in communication with the controller 19 and the power source 16 as previously described in FIGS. 2 and 3.

While these embodiments have been described with emphasis on the embodiments, it should be understood that within the scope of the appended claims, the embodiments might be practiced other than as specifically described herein.

What is claimed is:

1. An apparatus for creating a lighting effect in a controlled access venue, wherein the apparatus comprises:
   a. a flexible substrate comprising at least one of: a stiff paper, a flexible crystalline plastic, a cardboard sheet, a thin aluminum plate, a flexible metal plate, a rubberized plate or a 2 millimeter thin plate of a flexible and shape supporting synthetic material;
   b. a power source connected with the substrate, wherein the power source is a DC battery, a lithium ion battery, a printable battery, a solar cell battery, or combinations thereof; and
   c. at least one light emitting device electrically connected to the power source, wherein the at least one light emitting device is configured to provide a lighting effect when a signal is transmitted from a controller, and wherein the at least one light emitting device is configured to be controlled by any telemetry, and further wherein the at least one light emitting device is a light emitting diode, a fluorescent light, a halogen light, a neon light, an organic light emitting diode, a luminescent, or combinations thereof; and
   wherein the apparatus is configured to be portably worn or carried and the apparatus is configured for being tracked for position through security gates.

2. The apparatus of claim 1, wherein the at least one light emitting device is an electroluminescent coating printed on the flexible substrate in electrical communication with the power source.

3. The apparatus of claim 1, further comprising a plurality of light emitting devices connected in series, in parallel, or combinations thereof, to the power source.

4. The apparatus of claim 1, wherein the power source is rechargeable.

5. The apparatus of claim 1, wherein the power source is replaceable.

6. The apparatus of claim 1, wherein the lighting effect is modified based on a specific frequency or sound from a specific instrument.

7. A method for creating a lighting effect in a controlled access venue, wherein the method comprises:

a. providing an apparatus for creating a lighting effect in a controlled access venue, wherein the apparatus is configured to be portably worn or carried, the apparatus is configured for being tracked for position in the controlled access venue, and the apparatus comprises:
   (i) a flexible substrate comprising at least one of: a stiff paper, a flexible crystalline plastic, a cardboard sheet, a thin aluminum plate, a flexible metal plate, a rubberized plate or a 2 millimeter thin plate of a flexible and shape supporting synthetic material;
   (ii) a power source connected with the flexible substrate, wherein the power source is a DC battery, a lithium ion battery, a printable battery, a solar cell battery, or combinations thereof; and
   (iii) at least one light emitting device electrically connected to a power source, wherein the at least one light emitting device is configured to provide a lighting effect when a signal is received from a controller, the at least one light emitting device is configured to be controlled by any telemetry, and the at least one light emitting device is a light emitting diode, a fluorescent light, a halogen light, a neon light, an organic light emitting diode, a luminescent, or combinations thereof; and
b. providing a first set of apparatus to a first set of attendees and providing a second set of apparatus, which are configured to respond to different telemetry than the first set of apparatus, to a second set of attendees.

8. The method of claim 7, further comprising causing manipulation of the light emitting device to create the lighting effect.

9. The method of claim 7, further comprising modifying the lighting effect of the first set of apparatus according to sound emitted from a first instrument, and modifying the second set of apparatus according to sound emitted from a second instrument.

10. An apparatus for creating a lighting effect in a controlled access venue, wherein the apparatus is configured to be portably worn or carried, the apparatus is configured for being tracked for position, wherein the apparatus comprises: a flexible substrate comprising at least one of: a stiff paper, a flexible crystalline plastic, a cardboard sheet, a thin aluminum plate, a flexible metal plate, and a rubberized plate, having at least one light emitting device connected with the flexible substrate, wherein the at least one light emitting device is a light emitting diode, a fluorescent light, a halogen light, a neon light, an organic light emitting diode, a luminescent, or combinations thereof, the at least one light emitting device is connected to a power supply, wherein the power supply is a DC battery, a lithium ion battery, a printable battery, a solar cell battery, or combinations thereof, and wherein the at least one light emitting device is configured to provide a lighting effect and send a message with music being performed on a stage when a signal is received from a controller.

* * * * *